US006435879B1

(12) United States Patent
Unsicker

(10) Patent No.: US 6,435,879 B1
(45) Date of Patent: Aug. 20, 2002

(54) METHOD AND DEVICE FOR CHECKING THE CORRECTNESS OF ANSWERS TO QUIZ QUESTIONS OVER THE MEDIA AND IN EVENTS, ESPECIALLY TELEVISION AND RADIO

(76) Inventor: Andreas Unsicker, Yorkstrasse 8, D-93049, Regensburg (DE)

( * ) Notice: Subject to any disclaimer, the term of this patent is extended or adjusted under 35 U.S.C. 154(b) by 0 days.

(21) Appl. No.: 09/601,054
(22) PCT Filed: May 4, 1999
(86) PCT No.: PCT/DE99/01330
§ 371 (c)(1),
(2), (4) Date: Jul. 24, 2000
(87) PCT Pub. No.: WO99/57666
PCT Pub. Date: Nov. 11, 1999

(30) Foreign Application Priority Data

May 5, 1998 (DE) .......................... 198 19 920

(51) Int. Cl.⁷ .................................. G09B 7/00
(52) U.S. Cl. ................ 434/322; 434/323; 434/327; 434/362; 434/354; 463/1; 273/429; 273/430
(58) Field of Search ............... 273/429, 430, 273/431, 432, 460; 463/1, 40, 42; 434/128, 177, 169, 258, 322, 323, 327, 362, 350, 351, 353, 354

(56) References Cited

U.S. PATENT DOCUMENTS

| 4,164,078 A | | 8/1979 | Goldfarb | |
| 4,227,318 A | | 10/1980 | Mims | |
| 4,303,398 A | | 12/1981 | Yoseloff | |
| 4,358,278 A | * | 11/1982 | Goldfarb | 434/337 X |
| 4,593,904 A | * | 6/1986 | Graves | 273/1 X |
| 4,745,468 A | | 5/1988 | Von Kohorn | |
| 5,108,115 A | * | 4/1992 | Berman et al. | 273/439 X |
| 5,453,015 A | | 9/1995 | Vogel | |
| 5,947,747 A | * | 9/1999 | Walker et al. | 434/354 X |

FOREIGN PATENT DOCUMENTS

| DE | 19547902 A1 | 6/1997 |
| EP | 0474923 A1 | 3/1992 |
| FR | 2734973 | 12/1996 |
| NL | 9201898 | 5/1994 |

\* cited by examiner

Primary Examiner—Joe H. Cheng
Assistant Examiner—Chanda Harris
(74) Attorney, Agent, or Firm—McGlew and Tuttle, P.C.

(57) ABSTRACT

A method and system are provided for quiz question game play. In order to check the correctness of answers to quiz questions or the like over the media and in events, the correctness of answers given by a participant to questions asked by the organizer is checked. This is done by converting answers into a question-related control data word by automatically allocating a confirmation data word verifying the correctness of the answer given by the participant to the organizer.

21 Claims, 3 Drawing Sheets

METHOD AND DEVICE FOR CHECKING THE CORRECTNESS OF ANSWERS TO QUIZ QUESTIONS OVER THE MEDIA AND IN EVENTS, ESPECIALLY TELEVISION AND RADIO

FIELD OF THE INVENTION

The present invention pertains to a process and a device for testing the correctness of answers to quiz questions via media and events, especially television and radio, in which for playing games, the coding of solutions entered in control data is performed at the organizer and the participant according to an identical mathematical formula.

BACKGROUND OF THE INVENTION

In quiz programs in events, especially via television or radio, but also in live events at fairs, events and the like, only the actively participating candidates have the possibility via a question and answer game to be identified as winners and to possibly be awarded a prize based on their knowledge and the answers given by them correctly.

The audience, especially at home, but also in live events, can participate in the quiz only passively, because the organizer is unable to immediately identify a winner according to the criterion "knowledge" among very many people. However, the organizer can also involve the audience in a quiz program by calling upon them to send an answer to the organizer in the form of a solution word or to call in and to give the solution over the telephone. However, such a method has decisive disadvantages, namely, a) The winners are not identified according to the criterion "knowledge" but according to the criterion "chance," because, e.g., one participant is selected at random among many respondents or one participant has reached the organizer with his answer among many callers. Most viewers therefore do not participate in such games, because, according to the current possibilities, the luck or chance in getting through a winner rather than the knowledge of the particular participant is in the foreground.

b) The questions or the problem put to the viewer can be of a very limited scope only, and what is usually requested is a few characters of a solution, a solution word or a sentence as a solution. This is due to the fact that the evaluation of a large number of viewers and consequently of a large number of questions becomes too expensive for the organizer. The consequence of this is that the viewer can be actively integrated in the quiz program over a very limited time period only.

c) In the case of sending in answers, e.g., by mail, the quiz event proper and the drawing of the winner are spaced apart in time so much that the quiz program loses much of its suspense for the participants.

A means for playing an electronic game with a play-back device for alphanumeric and graphic information, which is sent to the play-back device via a network or a storage medium, has been known from DE 195 47 902 A1. This information contains the coded solution. With such means, it is necessary to send coded solutions to the play-back device via an outward channel or an external storage medium. Additional information can be sent together with corresponding teletext pages, with a digital broadcast program signal, analog program signals provided with radio data system signal or by downloading from a CD. Consequently, an outward channel or an external storage medium for the coded solutions is always connected to the play-back device. This represents a considerable expense to the organizer. Furthermore, there is a risk that the coded solutions or answers will be fraudulently decoded and thus they imply considerable risks.

Furthermore, a means for participation in quiz games, which receives its information via an acoustic tone sent by the television set, a video or audio cassette, has been known from EP 0 474 923 A1. The means comprises an amplifier, a filter, a decoder, a keyboard, a display and a winner display. The signal transmission is performed via an audio channel, headphone and transmission line. Coded solutions are transmitted via an outward channel in this means as well, so that there is likewise a risk of decoding.

SUMMARY AND OBJECTS OF THE INVENTION

The object of the present invention is to propose a process and a device with which participation in quiz programs is possible without coded solutions having to be transmitted and without an outward channel being necessary.

This object is accomplished according to the present invention by the organizer and the participants each having an identical quiz computer, by the participant answering the questions asked in the event, by the participant entering the answers via a keyboard in a quiz computer, by permanently preset confirmation data being assigned to the control data in a memory of the device, by the control data and the confirmation data being displayed separately on the display in the device of the participant, by the organizer entering the correct answers to the questions asked via the keyboard in his quiz computer, by preset confirmation data being likewise assigned to the control data of the organizer's computer in a memory of the device, by the control data and—not recognizably for the participants—the confirmation data being displayed in the organizer's device, by the participant comparing the control data displayed on the organizer's device with the control data on his device, by the participant informing the organizer, e.g., over the telephone, that his control data agree with the control data of the organizer and communicating the confirmation data being displayed on his device to the organizer, and by the organizer comparing the confirmation data of the participant that are sent to him with his confirmation data. Other embodiments of the present invention are described herein.

In a preferred embodiment of the present invention, the answers to quiz questions are entered by the particular participant one after another in a quiz computer via a keyboard and stored. At the same time, the correct answers to the quiz questions are entered in a quiz computer located at the organizer and stored and the participant can then compare the control data item, which is determined from the data entered by him and is displayed on the display of the computer, with the control data item that is being displayed on the display of the computer at the site of the organizer. In case of the agreement between the control data items on both devices, i.e., if the participant has answered the question(s) correctly, the participant informs the organizer over the telephone that he gave the correct answers. For control, a confirmation data item is exclusively assigned in the computer to the control data item present on the display and is displayed on another display of the computer, so that the same confirmation data item is present on both the device of the organizer and the device of the participant, and the participant transmits this confirmation data item to the organizer over the telephone simultaneously with the control data item.

The present invention makes it possible to make quiz events very attractive to the audience via media, especially television and radio, because the participants actively participate in the question and answer game via the quiz computer and can be identified as winners as a real candidate during the program and according to the criterion "knowledge."

The process will be described in detail below:

The answers entered by the participant in the computer via the keyboard, e.g., in the form of characters of the keyboard, after depressing the START key, are converted into a sequence of numbers, e.g., by program control. A very specific confirmation data item, which is set by the computer program automatically and is in a defined relationship with the control data item and with this control data item only, is assigned to this sequence of numbers, which is called the control data item. The assignment may be performed in any manner desired, but it is necessary for this control data item to correspond to a single confirmation data item only. To eliminate sources of error as much as possible, the control data item and the confirmation data item are possibly high numbers (which may, of course, also be sequences of characters), and additional data may be assigned to these numbers for more security.

The consequence of the entry of answers via the keyboard of the computer is fundamentally, on the whole, a control data item, which triggers a confirmation data item, so that the participant in the quiz sets the control data item by his answers and assigns to the control data item a confirmation data item that corresponds to this control data item only and on which the participant has no influence.

The assignment of the control data item and the confirmation data item may be performed, e.g., in such a way that a large amount of pairs of numbers are stored in a memory, and a confirmation data item is assigned to a control data item. This requires a relatively large memory capacity if the particular data items consist of many digits.

To reduce the memory capacity needed, it is proposed according to the present invention that the control data item and the confirmation data item be permanently assigned to one another such that the pairs of numbers are not stored together and completely from the beginning in the memory, but the confirmation data item as well as the control data item are calculated according to a (different) mathematical formula, so that an unambiguous and single confirmation data item, which is, however, always calculated anew, is assigned to each control data item.

An additional data security against manipulations is achieved according to the present invention by suppressing and not displaying certain numbers in the case of the control data item used, so that the control data item is displayed in a truncated form and the solution word cannot thus be inferred from the truncated word. This also applies correspondingly to the case in which the confirmation data item is converted in addition to the control data item. This will be explained below on the basis of examples.

Another variant of the present invention, by which the degree of security against manipulations can be further increased, is the incorporation of another security step. If the control data item and the confirmation data item are displayed on the display of the device, the date and time are simultaneously displayed on the display of the device and the corresponding data are stored, so that the participant can later present his device as proof for identification and document that he secured his result and when he did so.

Another possibility of security is that the participant receives a personal identification number for this device, which is different from that of every other device of the same type.

For comparison of the confirmation data item that the winner or winners sends/send to the organizer, it may be expedient to incorporate an additional security component in such a form that the organizer switches his telephone line in such a way that a certain part of the telephone number to be dialed by the participant corresponds to a group of digits of the confirmation data item that represents the solution. The consequence of this is that only participants who have the correct solution can call but those with a wrong answer cannot, so that the switched lines will not be unnecessarily jammed.

According to a variant of the present invention, the answers to the questions asked are entered one after another via the keyboard, and each answer is stored by depressing a CONFIRMATION key, so that after entering an answer and depressing the CONFIRMATION key, the participant can enter the next answer and confirm this answer. The consequence of this method is that the individual answers are stored and made available in the quiz computer until the signal for generating the control data item, which appears on the display of the quiz computer and triggers the confirmation data item, which is displayed on a second display of the quiz computer, is given by depressing the END key.

In another variant of the process according to the present invention, the particular answer is entered via the keyboard of the device, a control data item, which corresponds to this answer, is triggered for this answer via the CONFIRMATION key, and the confirmation data item, which is assigned to the control data item and only to this control data item, is polled. If the next question is answered, another control data item is triggered for this answer. The process is continued by entering the solution via the keyboard, by depressing the CONFIRMATION key and triggering the new control data item and confirmation data item corresponding to the new answer.

Thus, the correctness of the answers is clarified immediately after the particular question in this second variant, so that the participant who gave a wrong answer to a question and determined this by comparing his control word with the control word of the organizer will no longer participate in further answering questions, but he can determine himself that he has been eliminated.

Such a procedure is particularly suitable if an elimination is to be performed among the participants, for which live events or similar events are especially suitable.

The process according to the present invention can also be performed via a virtual computer or the corresponding program or software of the device on a PC.

The present invention will be described below in connection with the drawings based on an exemplary embodiment.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
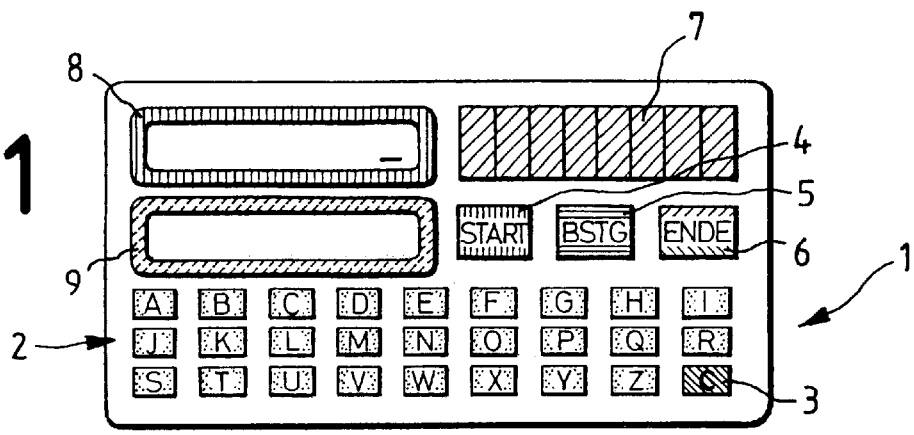
FIG. 1 is a view showing a state of a quiz computer in which all answers are stored in the device of a first variant of a procedure.
Figure 2:
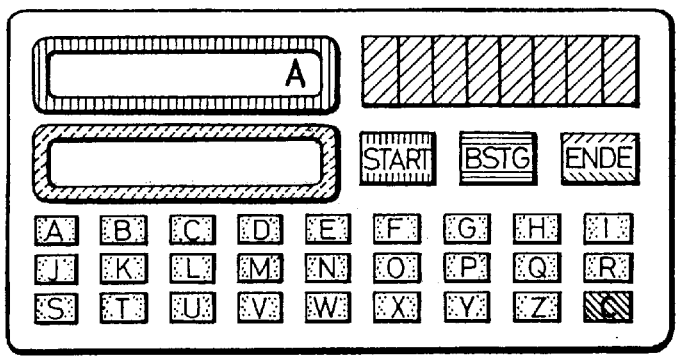
FIG. 2 is a view showing another state of the quiz computer of the first variant of a procedure.
Figure 3:
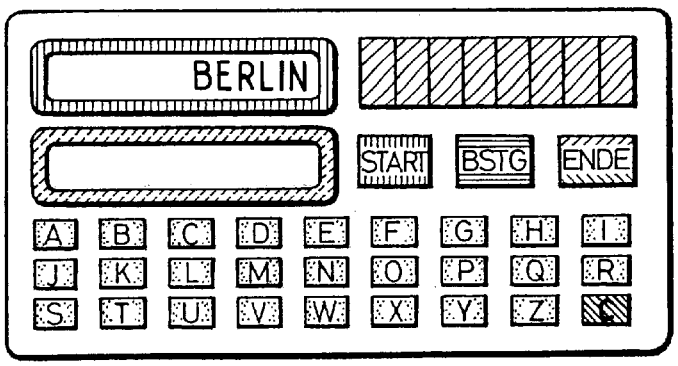
FIG. 3 is a view showing a another state of the quiz computer of the first variant of a procedure.
Figure 4:
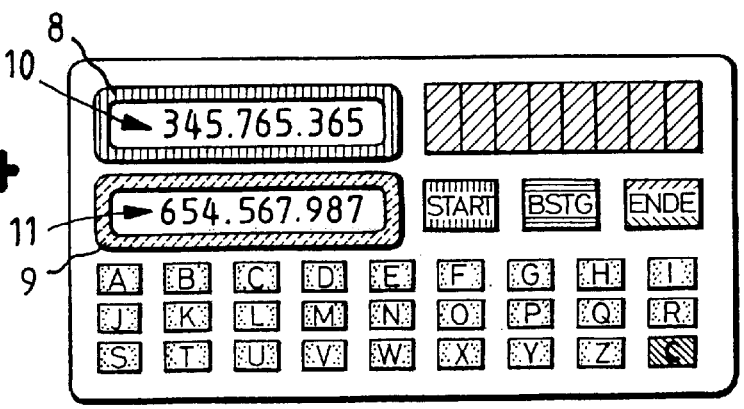
FIG. 4 is a view showing another state of the quiz computer of the first variant of a procedure with a control data item and a confirmation data item displayed at the end of the quizzing.
Figure 5:
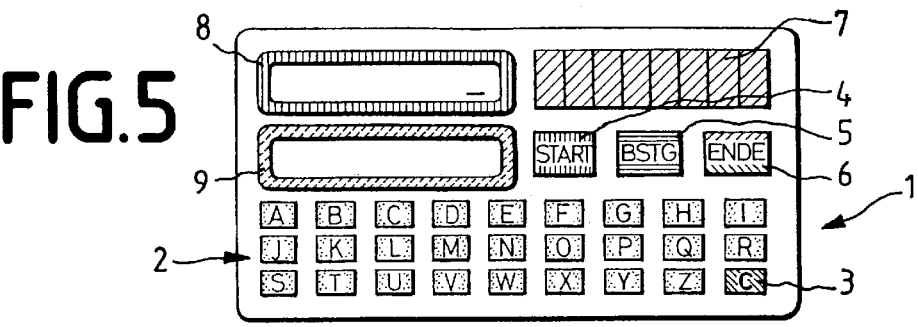
FIG. 5 is a view showing a state of the quiz computer of a second variant of the procedure.
Figure 6:
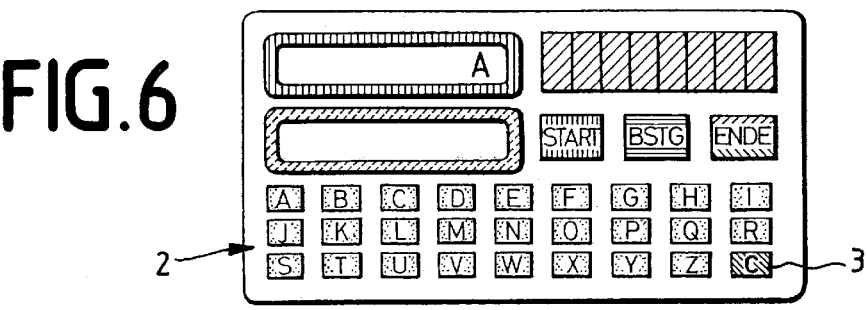
FIG. 6 is a view showing another state of the quiz computer of a second variant of the procedure.
Figure 7:
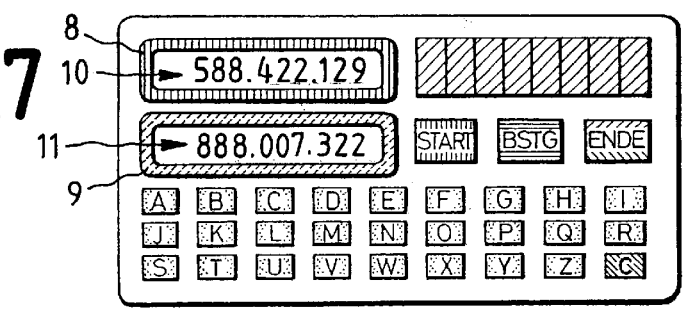
FIG. 7 is a view showing another state of the quiz computer of a second variant of the procedure.
Figure 8:
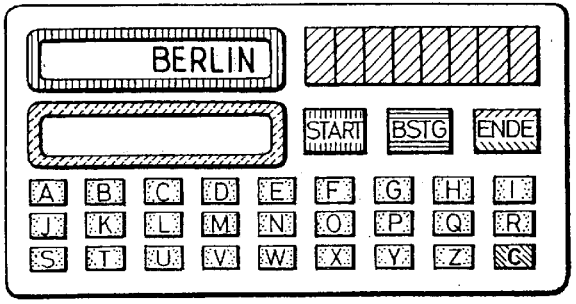
FIG. 8 is a view showing another state of the quiz computer of a second variant of the procedure.
Figure 9:
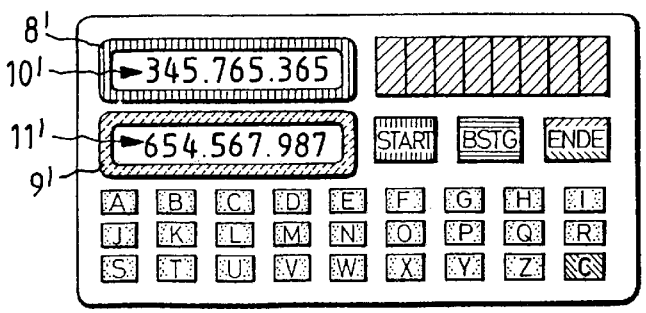
FIG. 9 is a view showing another state of the quiz computer of a second variant of the procedure.

Referring to the drawings in particular, a computer 1 has a keyboard 2, e.g., with the characters of the alphabet as well as a cancel key 3, as well as a START key 4, a CONFIRMATION key 5 and an END key 6, an electric power source 7, e.g., a solar panel, a display 8 for the control data item 10, and a display 9 for the confirmation data item 11.

To begin a game, the key 4 (START) is depressed and the device is put into operation. When the quiz master asks a question, the participant enters the answer via the keyboard 2 and confirms this answer by means of the CONFIRMATION key 5. This procedure is repeated in the case of consecutive questions, and the answers are stored as sequences. Once all the questions have been asked and answered, the key 6 is depressed and the game is terminated. The program now takes over the conversion of the characters or words entered into a control data item 10 on the display 8. At the same time, the corresponding confirmation data item 11 is displayed on the display 9 in the device. The participant can thus compare his control data item with the control data item at the organizer on the television screen.

The organizer has a device which corresponds to that of the participant and which has the same structure and functions, so that when the control data item is mixed in on the television screen, on which the number that represents the correct answers is displayed, the participant can compare the control data item being displayed on the display 8 of the quiz computer and determine whether all his answers were correct. The participant can thus check the correctness of the answers entered by him himself, and the participant will call the organizer and inform him that he answered all the questions correctly only if the control data item agrees with the control data item in the television picture.

Since the participant receives the control data item that corresponds to the correct answers from the organizer displayed on the television screen, he can, of course, also get on the telephone and send the correct control data item over the telephone despite incorrect answers after having seen this control data item on the television screen.

It is therefore necessary for the organizer to have a possibility of checking simultaneously and in a simple manner whether the data of the participant concerning the correctness of his answers are indeed correct. This is achieved by a confirmation data item 11 being displayed besides the control data item that corresponds to the correct answers on another display or the same display 9 which is linked with the control data item. The control data item and the confirmation data item form a single-time and unique pair of numbers. The confirmation data item is determined and assigned on the basis of the computer program such that a defined confirmation data item is assigned to each control data item, so that the control data item and the confirmation data item are made visible on the device practically simultaneously and in an unambiguous assignment to one another. Since the organizer has available the same device with the control data item representing the correct answers, and since a very specific confirmation data item is assigned to a defined control data item, the confirmation number (or the confirmation data item) would be a completely different number in the case of an incorrect control data item, so that cheating is ruled out in view of the complexity of the two numbers.

According to this above-described variant, the quiz computer 1 calculates or determines the control data item from the particular answers at the end of the question and answer game, in which all answers are consecutively stored in the memory of the device, so that the control data item on the display of the computer and the control data item at the organizer are compared with one another at the end of the questions and the confirmation data item, which is assigned to this control data item only, gives an unambiguous combination with the control data item. Consequently, there is practically a final account of the correct or incorrect answers only at the end of the questioning.

In another variant according to FIGS. 5–9, a decision is made on whether the answer to the given question was correct or incorrect after each answer and a control data item 10 as well as a confirmation data item 11, which is assigned to this control data item 10, is displayed on the displays 8 and 9 as soon as the answer has been given. By comparing his control data item with the organizer's control data item, the participant can thus determine after each question whether the answer was correct or not, so that he can determine himself whether he has been eliminated because of an incorrect answer and will no longer participate in the further quiz. If he determined from the control data item that the answer was correct, he will answer the next question in the further course of the quiz, so that control and confirmation data items 10', 11' will be displayed with each answer on the two displays 8', 9' and he can determine from this display whether continuation of his participation is meaningful.

The principle of the present invention will be explained below on the basis of simplified examples 1 and 2, which show how the solution word is converted in the device according to a permanently preset mathematical formula, how the confirmation data item is permanently assigned, and how the conversion of an incorrect solution word into a control data item is performed.

After each question or group of questions, the organizer can have the participants who have the correct control data item call in order to obtain an interim result or to perform an interim elimination.

Figure 10:
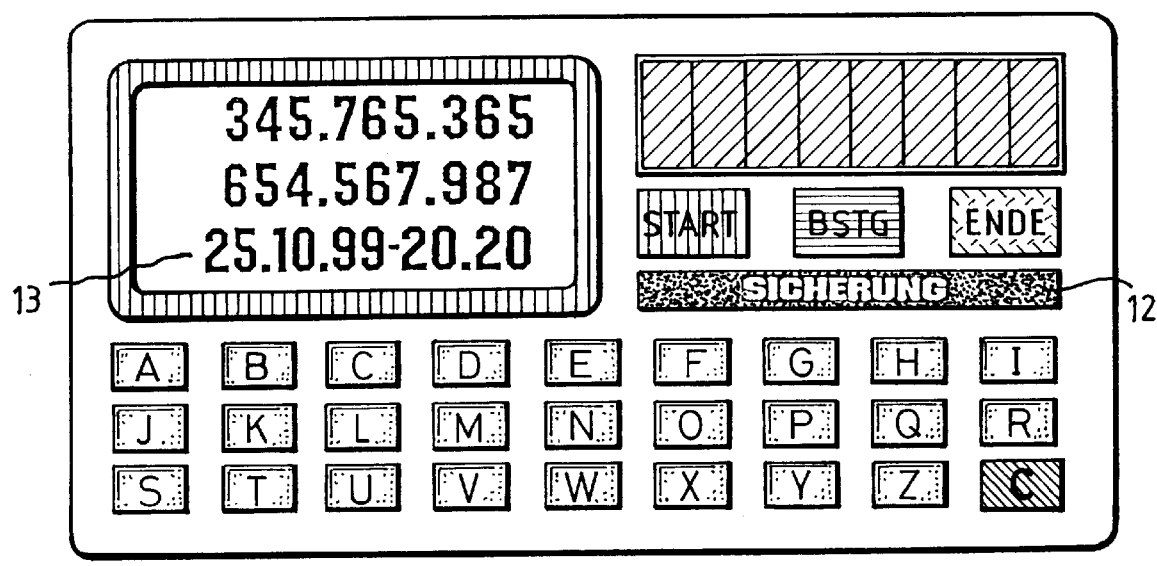
FIG. 10 is a representation of another embodiment of a device with additional security.

The display in the device according to FIG. 10 corresponds essentially to the device according to FIGS. 1–9 with the exception that a security key 12 is provided as well as another data line 13 is provided on the display for additional information (data, time, etc.).

| Example 1 | |
|---|---|
| Organizer's question: | Capital of Germany |
| Solution: | BERLIN |
| Entry in device: | BERLIN |
| Conversion into control data: | B = 2, E = 5, R = 18, L = 12, I = 9, N = 14 |
| | 2 + 5 + 18 + 12 + 9 + 14 = 60 |
| | 60 × ($13^7$ × 123) = 46308405<u>5460</u> |
| Organizer: | <u>630.845.546</u> |
| Fixed assignment of the confirmation data: | 476.987.089 |
| Entry in the participant's device: | BERLIN |
| Conversion into control data: | B = 2, E = 5, R = 18, L = 12, I = 9, N = 14 |
| | 2 + 5 + 18 + 12 + 9 + 14 = 60 |
| | 60 × ($13^7$ × 123) = 46308405<u>5460</u> |
| Participant: | |
| Control data: | <u>630.845.546</u> |
| Fixed assignment of the confirmation data: | 476.987.089 |
| Entry in the participant's device: | PARIS |
| Conversion into control data | P = 20, A = 1, R = 18, I = 9, S = 10 |
| | 21 + 1 + 18 + 9 + 19 = 58 |
| | 58 × ($13^7$ × 123) = 44764792<u>0276</u> |
| Participant | |
| Control data: | 476.472.027 |
| Fixed assignment of the confirmation data: | 897.456.237 |

| Example 2: | |
|---|---|
| Organizer's question: | Capital of Germany |
| Solution: | BERLIN |
| Entry in device: | BERLIN |
| Conversion into control data: | B = 2, E = 5, R = 18, L = 12, I = 9, N = 14 |
| | 2 + 5 + 18 + 12 + 9 + 14 = 60 |
| | 60 × ($13^7$ × 123) = 46308405<u>5460</u> |
| Conversion into confirmation data: | B = 5, E = 8, R = 21, L = 15, I = 12, N = 17 |
| | 5 + 8 + 21 + 15 + 12 + 17 = 78 |
| | 78 × ($11^8$ × 97) = 15<u>21839293</u>646 |
| Organizer: | |
| Control data: | <u>630.845.546</u> |
| Fixed assignment of the confirmation data: | <u>218.929.646</u> |
| Entry in the participant's device: | BERLIN |
| Conversion into control data: | B = 2, E = 5, R = 18, L = 12, I = 9, N = 14 |
| | 2 + 5 + 18 + 12 + 9 + 14 = 60 |
| | 60 × ($13^7$ × 123) = 46308405<u>5460</u> |
| Conversion into confirmation data: | B = 5, E = 8, R = 21, L = 15, I = 12, N = 17 |
| | 5 + 8 + 21 + 15 + 12 + 17 = 78 |
| | 78 × ($11^8$ × 97) = 16<u>21839293</u>646 |
| Participant: | |
| Control data: | <u>630.845.546</u> |
| Fixed assignment of the confirmation data: | <u>218.929.646</u> |
| Entry in the participant's device: | PARIS |
| Conversion into control data | P = 20, A = 1, R = 18, I = 9, S = 10 |
| | 21 + 1 + 18 + 9 + 19 = 58 |
| | 58 × ($13^7$ × 123) = 44764792<u>0278</u> |
| Conversion into confirmation data: | P = 24, A = 4, R = 21, I = 12, S = 22 |
| | 24 + 4 + 21 + 12 + 22 = 83 |
| | 58 × ($11^8$ × 97) = 17<u>25803350</u>931 |
| Participant: | |
| Control data: | 476.472.027 |
| Fixed assignment of the confirmation data: | 258.335.931 |

While specific embodiments of the invention have been shown and described in detail to illustrate the application of the principles of the invention, it will be understood that the invention may be embodied otherwise without departing from such principles.

What is claimed is:

1. A process for testing the correctness of answers to quiz questions via media and events, especially television and radio, in which a coding of solutions entered in control data is performed for playing games according to an identical mathematical formula at the organizer and the participant, the process comprising the steps of:
   a) providing the organizer and the participant with identical quiz computers;
   b) allowing the participant to answer questions asked during the event;
   c) entering, by the participant, the answers into a quiz computer via a keyboard;
   d) assigning permanently preset confirmation data to control data in a memory of the quiz computer;
   e) displaying the control data and the confirmation data separately on displays in the device of the participant;
   f) entering, by the organizer, the correct answers to the questions asked in the organizer quiz computer via a keyboard;
   g) assigning permanently preset confirmation data to the control data of the organizer's computer in a memory of the device;
   h) displaying the control data and the confirmation data, which is not recognizable to the participants, in the organizer's quiz computer;
   i) comparing, by the participant, the control data displayed on the organizer's device with the control data on the participant's device;
   k) informing the organizer, by the participant, that the participant's control data agrees with the control data of the organizer, and communicating the confirmation data being displayed on the participant's device to the organizer; and
   l) confirming, by the organizer, the transmitted confirmation data of the participant with the organizers confirmation data.

2. A process in accordance with claim 1, wherein a control data item corresponding to a solution word is determined according to a preset formula and a confirmation data item that corresponds to this control data item only is assigned to this control data item, and the two are stored as a unique data item pair, wherein there is no coding and no relationship that would permit the solution to the inferred between the control data and the confirmation data.

3. A process in accordance with claim 1, wherein a control data item corresponding to a solution word is calculated according to a preset formula and, independently from this, a confirmation data item corresponding to the same solution word is calculated according to another, preset formula separately from one another and are displayed on the display, wherein there is no coding and no relationship that would permit the solution to be inferred between the control data and the confirmation data.

4. A process in accordance with claim 3, wherein certain digits are suppressed or changed in the control data item corresponding to the solution word and the calculated control data item is thus displayed in a truncated form.

5. A process in accordance with claim 3, wherein certain digits are suppressed or changed in the confirmation data item corresponding to the solution word and the confirmation data item is thus displayed on the display in a truncated form.

6. A process in accordance with claim 5, wherein the date, time and/or additional data are displayed on the display of the device and stored for the purposes of proof together with the control data item and the confirmation data item.

7. A process in accordance with claim 1, wherein a personal identification number is assigned to each participant or each participant's device for security reasons.

8. A process in accordance with claim 1, wherein said step of informing the organizer includes using a telephone to inform the organizer via a telephone connection to at least one telephone line of the organization.

9. A process in accordance with claim 8, wherein a telephone line of the organizer is provided with telephone access numbers to be dialed by the participant corresponding to a group of digits of the confirmation data item which represents the solution.

10. A process in accordance with claim 1, wherein said step of communicating the participant's control data to the organizer includes using a telephone to inform the organizer via a telephone connection to at least one telephone line of the organization wherein a telephone line of the organizer is provided with telephone access numbers to be entered by the participant corresponding to a group of digits of the confirmation data item which represents the solution.

11. A device for a process for testing the correctness of answers to quiz questions via media and events, especially television and radio, in which a coding of solutions entered in control data is performed for playing games according to an identical mathematical formula at the organizer and the participant, the process including providing the organizer and the participant with quiz computers, allowing the participant to answer questions asked during the event, entering, by the participant, the answers into a quiz computer via a keyboard, assigning permanently preset confirmation data to control data in a memory of the quiz computer, displaying the control data and the confirmation data separately on displays in the device of the participant, entering, by the organizer, the correct answers to the questions asked in the organizer quiz computer via a keyboard, assigning permanently preset confirmation data to the control data of the organizer's computer in a memory of the device, displaying the control data and the confirmation data, which is not recognizable to the participants, in the organizer's quiz computer, comparing, by the participant, the control data displayed on the organizer's device with the control data on the participant's device, informing the organizer, by the participant, that the participant's control data agrees with the control data of the organizer, and communicating the confirmation data being displayed on the participant's device to the organizer and confirming, by the organizer, the transmitted confirmation data of the participant with the organizers confirmation data, the device comprising:

a keyboard for entering data corresponding to the answers related to the questions with a START key, a CONFIRMATION key and an END key;

two displays separated from one another, on which the answers entered are also displayed via the keyboard, stored in the device and control data and confirmation data are displayed;

a quiz computer;

a program installed in the quiz computer, which converts the answers entered via the keyboard into control data in conjunction with the END key and selects confirmation data on the basis of these control data, which confirmation data are assigned to these control data and to these control data only.

12. A device in accordance with claim 11, wherein said keyboard includes a SECURITY key, and said display displays additional security data.

13. A device in accordance with claim 11, wherein said additional security data includes at least one of a date, the time or corresponding information.

14. A device in accordance with claim 11, wherein said quiz computer calculates a control data item corresponding to a solution word is calculated according to a preset formula and, independently from this, a confirmation data item corresponding to the same solution word is calculated according to another, preset formula separately from one another and are displayed on the display, wherein there is no coding and no relationship that would permit the solution to be inferred between the control data and the confirmation data.

15. A process for testing the correctness of answers to quiz questions via media and events, the process comprising the steps of:

providing the organizer with an organizer computer;

providing the participant with a participant computer;

providing a question or series of questions by the organizer;

entering answers into the participant computer via a computer input;

using identical mathematical formula at the organizer computer and at the participant computer to convert an answer entered in the organizer computer into control data and an answer entered in the participant computer into the same control data;

using identical mathematical formula at the organizer computer and at the participant computer or assigned permanently preset confirmation data to control data relationships in a memory at the organizer computer and at the participant computer to determine or assign confirmation data corresponding to the control data at each of the participant computer and the organizer computer;

entering a correct answer to the question or questions asked in the organizer computer via a computer input and providing the correct answer control data and corresponding confirmation data to the organizer;

displaying the control data to the participant;

entering an answer to the question or questions asked in the participant computer via a computer input and generating corresponding control data and confirmation data and displaying same to the participant;

comparing the control data displayed by the organizer's computer with the control data generated by the participant's computer;

communicating the participant's control data to the organizer; and confirming the correct answer by communicating the participants confirmation data to the organizer and checking for a match in organizer computer confirmation data and participant confirmation data.

16. A process in accordance with claim 15, wherein a control data item corresponding to a solution word is determined according to a preset formula and a confirmation data item that corresponds to this control data item only is assigned to this control data item, and the two are stored as a unique data item pair, wherein there is no coding and no relationship that would permit the solution to the inferred between the control data and the confirmation data.

17. A process in accordance with claim 15, wherein a control data item corresponding to a solution word is calculated according to a preset formula and, independently from this, a confirmation data item corresponding to the same solution word is calculated according to another, preset formula separately from one another and are displayed on the display, wherein there is no coding and no relationship that would permit the solution to be inferred between the control data and the confirmation data.

18. A process in accordance with claim 17, wherein certain digits are suppressed or changed in the control data item corresponding to the solution word and the calculated control data item is thus displayed in a truncated or changed form.

19. A process in accordance with claim 17, wherein certain digits are suppressed or changed in the confirmation data item corresponding to the solution word and the confirmation data item is thus displayed on the display in a truncated or changed form.

20. A process in accordance with claim 17, wherein the date, time and/or additional data are displayed on the display of the device and stored for the purposes of proof together with the control data item and the confirmation data item.

21. A process in accordance with claim 15, wherein a personal identification number is assigned to each participant or each participant's device for security reasons.

* * * * *